United States Patent [19]

Alewelt et al.

[11] Patent Number: 4,771,120
[45] Date of Patent: Sep. 13, 1988

[54] POLYARYLENE SULPHIDE CAPPED WITH MONOPHENOL COMPOUND

[75] Inventors: Wolfgang Alewelt; Franz Alfes, both of Krefeld; Wolfgang Eisermann, Duesseldorf; Wolfgang Jakob, Moers; Erhard Tresper, Krefeld, all of Fed. Rep. of Germany

[73] Assignee: Bayer Aktiengesellschaft, Leverkusen, Fed. Rep. of Germany

[21] Appl. No.: 1,047

[22] Filed: Jan. 7, 1987

[30] Foreign Application Priority Data

Jan. 17, 1986 [DE] Fed. Rep. of Germany ....... 3601215

[51] Int. Cl.[4] ............................................. C08G 75/16
[52] U.S. Cl. ................................................. 528/388
[58] Field of Search ......................................... 528/388

[56] References Cited

U.S. PATENT DOCUMENTS 3,852,214 12/1974 Gallagher et al. .................. 528/388
4,378,442 3/1983 Marsh et al. ........................ 528/388
4,605,732 8/1986 Heitz et al. ........................... 528/388
4,663,431 5/1987 Fujii et al. ............................ 528/388

FOREIGN PATENT DOCUMENTS 79144 5/1983 European Pat. Off. .

Primary Examiner—Harold D. Anderson
Attorney, Agent, or Firm—Connolly and Hutz

[57] ABSTRACT

The invention relates to polyarylene sulphides with melt viscosities settable to defined values. The products are distinguished by high stability of the melt. They are obtained by adding, in the preparation of these polyarylene sulphides, certain phenols as chain terminators to the reaction mixture.

5 Claims, No Drawings

POLYARYLENE SULPHIDE CAPPED WITH MONOPHENOL COMPOUND

The invention relates to high molecular weight, optionally branched, polyarylene sulphides which are prepared in conventional manner by adding to the reaction mixture 0.1–5 mol %, preferably 0.25–4 mol %, of a monophenol as a chain regulator to set the melt viscosity.

Polyarylene sulphides and their preparation are known (see for example U.S. Pat. No. 2,513,188). The addition of inorganic or organic salts to the reaction mixture is, as is known, supposed to contribute to reducing the melt flow and/or to increasing the melt viscosity of the polyphenylene sulphides obtained. It is only when the melt viscosity is sufficiently high that polyphenylene sulphides can be processed thermoplastically, for example to give injection mouldings, films and fibres. Without addition of the abovementioned salts, the polyphenylene sulphides obtained achieve the necessary low melt flow only via a separate and additional postcondensation or hardening (curing).

The salts used are for example alkali metal carboxylates (DE-AS (German Published Specification) No. 2,453,749), lithium halides or alkali metal carboxylates (DE-OS (German Published Specification), No. 2,623,362), lithium chloride or lithium carboxylate (DE-OS (German Published Specification) No. 623,363), alkali metal carbonates in combination with alkali metal carboxylates (U.S. Pat. No. 4,038,259), lithium acetate (DE-OS (German Published Specification), No. 2,623,333), trialkali metal phosphates (DE-OS (German Published Specification) No. 2,930,710), trialkali metal phosphonates (DE-OS (German Published Specification) No. 2,930,797), alkali metal fluorides (DE-OS (German Published Specification)No. 3,019,732), alkali metal sulphonates (U.S. Pat. No. 4,038,260), lithium carbonate and lithium borate (U.S. Pat. No. 4,030,518).

DE-OS (German Published Specification), No. 3,120,538 discloses obtaining polyarylene sulphides having high melt viscosities by adding N,N-dialkylcarboxamides to the reaction mixture.

The use of polar solvents for preparing polyarylene sulphides has likewise been described there.

Furthermore, monothiophenols, mercaptans and monohalogenoaromatics are described as chain terminators. They have in the case of the thio compounds the disadvantage of oxygen sensitivity, which can reduce the chain terminator action and cause discolorations in the product; in the case of the monohalogenoaromatics their low reactivity is responsible for an unsatisfactory chain terminator action.

It has now been found that by adding monophenols it is possible to obtain polyarylene sulphides which are distinguished by settable melt viscosities and high stability of the melt.

The invention provides high molecular weight, optionally branched, polyarylene sulphides which are prepared from (a) 50–100 mol % of dihalogenoaromatics of the formula

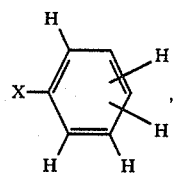
(I)

and 0–50 mol % of dihalogenoaromatics of the formula

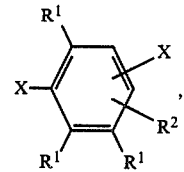
(II)

in which

X stands for halogen, such as chlorine or bromine, in the meta and para position to each other and $R^1$ and $R^2$ is identical or different and can be hydrogen, $C_1$–$C_4$-alkyl, $C_5$–$C_{10}$-cycloalkyl, $C_6$–$C_{10}$-aryl, $C_7$–$C_{10}$-alkylaryl, $C_7$–$C_{14}$-arylalkyl, 24 213 it being possible for the two radicals $R^1$ which are in the ortho position to each other to be linked together to form an aromatic or heterocyclic ring containing up to three hetero atoms such as N,O,S, and always one radical $R^1$ is different from hydrogen and (b) 0–5 mol %, preferably 0.1–2.5 mol %, relative to the total of the dihalogenoaromatics of the formula I and II, of a trihalogenoaromatic or tetrahalogenoaromatic of the formula $$ArX_n \qquad (III)$$

where

Ar is an aromatic $C_6$–$C_{14}$-radical or a heterocyclic radical having 5–14 ring atoms, where up to 3 ring C atoms can be replaced by hetero atoms such as N,O,S, X stands for halogen such as chlorine or bromine and n stands for the number 3 or 4 and (c) 50–100 mol % of alkali metal sulphide, preferably sodium sulphide or potassium sulphide or their mixture, for example in the form of their hydrates or aqueous mixtures, optionally together with small amounts of alkali metal hydroxides such as sodium hydroxide and potassium hydroxide, and 0–50 mol % of alkali bisulphide, preferably sodium hydrogensulphide and potassium hydrogensulphide, or their mixture, where the molar ratio of (a+b): c can be within the range from 0.75:1 to 1.25:1, (d) optionally in the presence of reaction accelerants such as alkali metal carboxylates, alkali metal phosphates, alkali metal phosphonates, alkali metal fluorides, alkali metal alkylsulphonates or in the presence of N,N-dialkylcarboxamides, lactams, anhydrides and esters of carboxylic acids, characterized in that the reaction mixture has added to it 0.1–5 mol %, preferably 0.25–4 mol %, relative to dihalogeno compound, of monophenols of the formula (IV)

$$HO-A-Z-R^3 \qquad (IV)$$

in which

A is an aromatic radical of the formulae (V), (VI) and (VII)

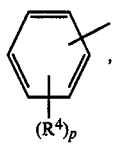

(V)

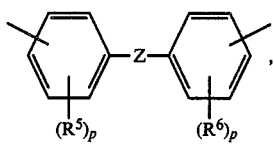

(VI)

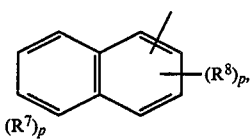

(VII)

in which the radicals $R^3$, $R^4$, $R^5$, $R^6$, $R^7$ and $R^8$ independently stand for $C_1$-$C_{12}$-alkyl, $C_7$-$C_{19}$-alkaryl/aralkyl, $C_3$-$C_6$-cycloalkyl and Z stands for $C_1$-$C_6$-alkylidene, $C_2$-$C_6$-cycloalkylidene, CO, —S—, —SO—, —SO$_2$, O or represents a chemical single bond and p stands for the number 0, 1, 2, 3 or 4.

The phenols can also be employed as salts, for example alkali metal or alkaline earth metal salts.

The phenols of the formula IV can be added before or during the polymerization reaction.

And it is also possible to add mixtures of phenols. The addition can be effected by metering over a certain time period of the reaction, in portions at certain times of the course of reaction or by direct addition of the calculated total amount at a defined time of the reaction.

The polyarylene sulphides prepared according to the invention are distinguished by defined melt viscosities depending on the chain terminator content, these melt viscosities being reproducible. This is of great importance insofar as, to prepare the polyarylene sulphides, it is necessary to set polymer melts with different flow behaviours which must be adapted to the particular intended purpose.

For instance, the preparation of films and fibres requires higher melt viscosities than setting glass fibre or glass fibre/mineral-reinforced injection moulding types.

A further advantage of the polyarylene sulphides according to the invention is the higher stability under thermal stress. Only in this way is it ensured that no further build-up or degradation which can lead to a complete change in the spectrum of properties occurs in the course of the thermoplastic processing, and that regenerate can be re-used after processing.

The work-up of the reaction mixture and the isolation of the polyarylene sulphides can be carried out in known, conventional manner.

Monophenols which can be used according to the invention are for example phenols, cresols and higher alkylated phenols, alkoxyphenols, phenoxyphenols, hydroxyphenyl alkyl sulphides, hydroxydiphenyl sulphides, hydroxydiphenyl sulphoxides, hydroxydiphenyl sulphones, hydroxydiphenyl ketones, hydroxydiphenyls, hydroxynaphthalenes.

Preference is given to using:

phenol, p-tert.-butylphenol, p-isooctylphenol, 4-methoxyphenol, 4-hydroxydiphenyl ether, 4-hydroxyphenyl ethyl sulphide, 4-hydroxydiphenyl sulphide, 4-hydroxydiphenyl sulphoxide, 4-hydroxydiphenyl sulphone, 4-hydroxydiphenyl ketone, 4-hydroxydiphenyl, 2-hydroxynaphthalene.

The polyarylene sulphides according to the invention can be processed to give films or fibres or can be mixed with other polymers, pigments and fillers—for example graphite, metal powders, glass powder, ground quartz, glass fibres or carbon fibres —, or have added to them the additives customary for polyarylene sulphides, for example stabilizers or mould release agents.

In general, the melt flow behaviour of polyarylene sulphides is measured by ASTM 1238-70 at 316° C. using a 5 kg weight and quoted in g/10 min.

However, in the case of high melt flow values this measurement can present difficulties owing to the high efflux rate of the polymer melt.

For that reason the melt viscosity m of the polymer melt (in Pa.s) was determined at 306° C. as a function of the shear stress (in Pa) by means of the Instron rotation viscometer.

In this way the melt viscosity can be determined in a very wide range from $10^{-1}$ to $10^7$ Pa.s. In the Instron rheometer, the polymer is melted between a solid plate in a rotatable cone and the torque of the cone is determined. From the torque, the angular velocity and the apparatus settings it is possible to calculate the melt viscosity as a function of the shear stress. The Instron 3250 rheometer was used; diameter of cone and plate: 2 cm. The melt viscosity quoted is that measured at a shear stress of $\tau = 10^3$ Pa.

The polyarylene sulphides according to the invention have, after isolation from the reaction mixture, melt viscosities between 1 and $1 \times 10^3$ Pa s, preferably 5 to $5 \times 10^2$ Pa.s. They can be processed in conventional manner.

Examples

EXAMPLE 1

Into 2100 g of N-methylcaprolactam and 940.8 g of p-dichlorobenzene were metered 756.75 g of sodium sulphide hydrate (about 60% strength) 135 g of 2.5% strength sodium hydroxide solution and 100 g of caprolactam at a temperature of 220° C.

The rate of addition depends on the conversion and is adjusted to be such that the temperature of 220° C. can be maintained with simultaneous additional heating of the reaction vessel. In the course of the metered addition, the water is at the same time removed out of the reaction.

After the metered addition, 9 g of phenol in 50 ml of N-methylcaprolactam are added. After 7 hours of subsequent reaction time at a slow reflux, the PPS is precipitated in water, is washed until electrolyte-free and is briefly extracted with an organic solvent. The dried p-polyphenyl sulphide has a melt viscosity of 45 Pa.s (measured at $10^3$ Pa and 306° C.).

EXAMPLE 2 (Comparative example to Example 1 without chain terminator)

Like Example 1, except that no phenol is used. The polyphenylene sulphide obtained has a melt viscosity of 1380 Pa.s (measured at $10^3$ Pa and 306° C.).

EXAMPLE 3

Like Example 1, except that 3.0 g (0.5 mol %) phenol are used. The polyphenylene sulphide obtained has a melt viscosity of 210 Pa.s (measured at $10^3$ Pa and 306° C.).

EXAMPLE 4

Like Example 1, except that 15 g (2.5 mol %) of phenol are used. The polyphenylene sulphide obtained has a melt viscosity of 12 Pa.s (measured at $10^3$ Pa and 306° C.).

EXAMPLE 5

Like Example 1, except that phenol is already added at the start of the metered addition. The polyphenylene sulphide obtained has a melt viscosity of 52 Pa.s (measured at $10^3$ Pa and 306° C.).

EXAMPLE 6

Like Example 1, except that 19.8 g of p-isooctylphenol are used as chain terminator. The polyphenylene sulphide obtained has a melt viscosity of 44 Pa.s (measured at $10^3$ Pa and 306° C.).

To test the thermal stability of the polyphenylene sulphides, the products of Example 1 and Example 2 were melted under comparative conditions in a two-shaft extruder of the ZSK 32 type at 320° C., taken off as filaments and granulated. The process was repeated three times and subsequently the melt viscosity determined:

PPS of Example 1: 80 Pa.s (measured at $10^3$ Pa and 306° C.)

PPS of Example 2: 40 Pa.s (measured at $10^3$ Pa and 306° C.)

We claim:

1. High molecular weight, branched or unbranched, polyarylene sulphide prepared from a reaction mixture comprising:

(a) 50-100 mol % of at least one dihalogenoaromatic of the formula $$\text{(I)}$$

(structure: benzene ring with H at four positions and X at two positions)

and 0-50 mol % of at least one dihalogenoaromatic of the formula $$\text{(II)}$$

(structure: benzene ring with $R^1$, X, $R^2$, $R^1$, $R^1$, X substituents)

in which

X is halogen, in the meta and para position to each other and each of $R^1$ and $R^2$ is identical or different and is hydrogen, $C_1$-$C_4$-alkyl, $C_5$-$C_{10}$-cycloalkyl, $C_6$-$C_{10}$-aryl, $C_7$-$C_{10}$-alkylaryl, $C_7$-$C_{14}$-arylalkyl, or two radicals $R^1$ in the ortho position to each other together form an aromatic or heterocyclic ring containing up to three hetero atoms, with the proviso that one radical $R^1$ is different from hydrogen and (b) 0-5 mol %, relative to the total of the dihalogenoaromatics of the formula I and II, of a trihalogenoaromatic or tetrahalogenoaromatic of the formula III $$\text{ArXn} \quad \text{(III)}$$

where

Ar is an aromatic $C_6$-$C_{14}$-radical or a heterocyclic radical having 5-14 ring atoms, where up to 3 ring C atoms are replaced by hetero atoms, X is halogen, and n is the number 3 or 4 and (c) 50-100 mol % of alkali metal sulphide, and 0-50 mol % of alkali bisulphide, where the molar ration of (a+b):c is within the range from 0.75:1 to 1.25:1, characterized in that the reaction mixture further comprises 0.1-5 mol %, relative to the dihalogeno compound, of a monophenol of the formula IV $$\text{HO—A—Z—R}^3 \quad \text{(IV)}$$

or alkali metal or alkaline earth metals salts of said monophenol of the formula IV, in which A is an aromatic radical of the formulae (V), (VI) or (VII)

$$\text{(V)}$$

(benzene ring with $(R^4)_p$)

$$\text{(VI)}$$

(two benzene rings linked by Z, with $(R^5)_p$ and $(R^6)_p$)

$$\text{(VII)}$$

(naphthalene with $(R^7)_p$ and $(R^8)_p$)

in which each radical $R^3$, $R^4$, $R^5$, $R^6$, $R^7$ and $R^8$ independently of each other is $C_1$-$C_{12}$-alkyl, $C_7$-$C_{19}$-alkaryl/aralkyl, $C_3$-$C_6$-cycloalkyl and Z is $C_1$-$C_6$-alkylidene, $C_2$-$C_6$-cycloalkylidene, CO, —S—, —SO—, —SO$_2$—, O or Z represents a chemical single bond and p is the number 0, 1, 2, 3 or 4.

2. A process for preparing high molecular weight branched or unbranched polyarylene sulphide which comprises reacting a mixture of:

(a) 50-100 mol % of at least one dihalogenoaromatic of the formula

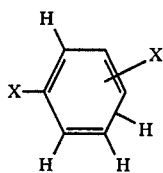
(I)

and 0–50 mol % of at leeast one dihalogenoaromatic of the formula

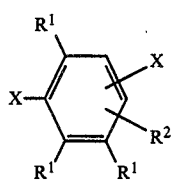
(II)

in which
X is halogen, in the meta and para position to each other and each of $R^1$ and $R^2$ is identical or different and is hydrogen, $C_1$–$C_4$-alkyl, $C_5$–$C_{10}$-cycloalkyl, $C_6$–$C_{10}$-aryl, $C_7$–$C_{10}$-alkylaryl, $C_7$–$C_{14}$-arylalkyl, or two radicals $R^1$ in the ortho position to each other together form an aromatic or heterocyclic ring containing up to three hetero atoms, with the proviso that one radical $R^1$ is different from hydrogen and (b) 0–5 mol %, relative to the total of the dihalogenoaromatics of the formula I and II, of a trihalogenoaromatic or tetrahalogenoaromatic of the formula III ArXn  (III)

where
Ar is an aromatic $C_6$–$C_{14}$-radical or a heterocyclic radical having 5–14 ring atoms, where up to 3 ring C atoms are replaced by hetero atoms, X is halogen, and n is the number 3 or 4 and (c) 50–100 mol % of alkali metal sulphide, and 0–50 mol % of alkali bisulphide, where the molar ratio of (a+b):c is within the range from 0.75:1 to 1.25:1, characterized in that the mixture further comprises 0.1–5 mol %, relative to the dihalogeno compound, of a monophenol of the formula IV

HO—A—Z—$R^3$  (IV)

or alkali metal or alkaline earth metals salts of said monophenol of the formula IV, in which
A is an aromatic radical of the formulae (V), (VI) or (VII)

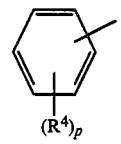
(V)

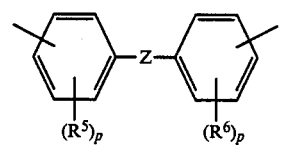
(VI)

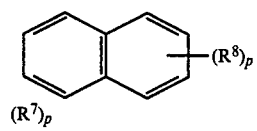
(VII)

in which
each radical $R^3$, $R^4$, $R^5$, $R^6$, $R^7$ and $R^8$ independently of each other is $C_1$–$C_{12}$-alkyl, $C_7$–$C_{19}$-alkaryl/aralkyl, $C_3$–$C_6$-cycloalkyl and Z is $C_1$–$C_6$-alkylidene, $C_2$–$C_6$-cycloalkylidene, CO, —S—, —SO—, —SO$_2$—, O or Z represents a chemical single bond and p is the number 0, 1, 2, 3 or 4.

3. Process according to claim 2, wherein amount of monophenol is 0.25 to 4.0 mol %.

4. Process according to claim 2, wherein the monophenol is phenol.

5. Process according to claim 2, wherein the monophenol is the alkali metal or alkaline earth metal salt of the monophenol.

* * * * *